(12) United States Patent
Chim

(10) Patent No.: US 6,275,258 B1
(45) Date of Patent: Aug. 14, 2001

(54) VOICE RESPONSIVE IMAGE TRACKING SYSTEM

(76) Inventor: Nicholas Chim, 358 Wildwood Ave., Piedmont, CA (US) 94611

( * ) Notice: Subject to any disclaimer, the term of this patent is extended or adjusted under 35 U.S.C. 154(b) by 0 days.

(21) Appl. No.: 08/767,725

(22) Filed: Dec. 17, 1996

(51) Int. Cl.$^7$ ................................................. H04N 5/232
(52) U.S. Cl. ............................ 348/211; 348/15; 348/169
(58) Field of Search .............................. 348/207, 13, 14, 348/15, 16, 17, 20, 211, 212, 213, 169; H04N 5/225

(56) References Cited

U.S. PATENT DOCUMENTS

| | | | |
|---|---|---|---|
| 5,206,721 | * 4/1993 | Ashida et al. | ............... 348/15 |
| 5,418,595 | 5/1995 | Iwasaki et al. . | |
| 5,430,809 | 7/1995 | Tomitaka . | |
| 5,434,617 | 7/1995 | Bianchi . | |
| 5,438,357 | 8/1995 | McNelley . | |
| 5,473,369 | 12/1995 | Abe . | |
| 5,500,671 | 3/1996 | Andersson et al. . | |
| 5,552,823 | 9/1996 | Kageyama . | |
| 5,572,317 | 11/1996 | Parker et al. . | |
| 5,589,878 | * 12/1996 | Cortjens et al. | ............... 348/211 |

\* cited by examiner

*Primary Examiner*—Tuan Ho
(74) *Attorney, Agent, or Firm*—Jeffrey P. Aiello; Carol D. Titus; James J. Leary

(57) ABSTRACT

A camera tracking system that continuously tracks sound emitting objects is provided. A sound activation feature of the system enables a video camera to track speakers in a manner similar to the natural transition that occurs when people turn their eyes toward different sounds. The invented system is well suited for video-phone applications. The invented tracking system comprises a video camera for transmitting an image from its remote location, a screen for receiving images, and microphones for directing the camera. The camera may be coupled to the microphones via an interface for processing information transmitted from the microphones for directing the camera. The system may utilize the translucent properties of LCD screens by disposing a video camera behind such a screen and enabling persons at each remote location to look directly into the screen and at the camera. The interface enables intelligent framing of a speaker without mechanically repositioning the camera. The microphones are positioned using triangulation techniques. Characteristics of audio signals are processed by the interface for determining movement of the speaker for directing the camera. As the characteristics sensed by the microphones change, the interface directs the camera toward the speaker. The interface continuously directs the camera, until the change in the characteristics stabilizes, thus precisely directing the camera toward the speaker.

41 Claims, 3 Drawing Sheets

VOICE RESPONSIVE IMAGE TRACKING SYSTEM

BACKGROUND OF THE INVENTION

1. Field of the Invention

The present invention relates generally to teleconferencing systems having video camera that track an image, and more particularly, to a system that continuously tracks a sound emitting object and transmits an image of the object and sound generated thereby.

2. Description of Related Art

Teleconferencing or video-conferencing is an increasingly prevalent communication tool, particularly in business. Teleconferencing, video teleconferencing, video-conferencing, and video-phone each refer to the substantially simultaneous transmission of audio and visual signals between two or more remote locations for communication between the two locations. Teleconferencing enables conferees at two or remote sites to interact as if they were together in a conference room. The increasing sophistication level of the infrastructure surrounding teleconferencing, such as increasing data transmission rates due to optical fiber lines for example, have helped to provide an suitable conference environment for the conferees.

Since there are often a number of conferees at each remote site, it is desirable to have a video transmitting device track each of the conferees, such as when they are speaking during the conference, just as one's eyes follow different persons when they are speaking. A number of systems have been disclosed in the prior art for tracking objects, such as conferees, for the purposes of a teleconference for example. The most prevalent systems for object tracking are visual tracking systems.

A disadvantage of visual tracking, and teleconferencing in general, is that conferees at each location typically look at the video camera transmitting their actions and not at the screen displaying the conferees at the remote location since the video camera is often adjacent to the screen. Thus conferees at each of the locations are gazing in directions slightly away from the screen, which is somewhat awkward for participants of the teleconference. Another disadvantage of visual tracking systems is that since people usually direct their attention by first hearing a sound, then moving their head and directing their eyes toward the sound, visual tracking is an unnatural transition between different speakers at a given location.

One visual tracking system is disclosed in U.S. Pat. No. 5,438,357, to McNelley. Disclosed therein is a system for teleconferencing that allows for natural eye contact between conferees. The system includes at least two terminals that each comprise a screen for displaying an image and a video camera for transmitting an image of a conferee to the remote screen. Audio communication means such as microphones and speakers are also provided to enable conferees to hear and speak to each other. The video camera at each location is located above the screen, and thus above eye level. Image manipulation is used to manipulate the image of a conferee and to redirect the apparent direction of the conferees gaze so that it appears that they are looking directly into the screen and at the conferees at the remote location. Image manipulation is further used therein to simulate zooming, tilting, and panning of the camera.

U.S. Pat. No. 5,500,671, to Andersson et al., discloses a video conference system that provides eye contact and a sense a presence to a plurality of conference participants located in respectively remotely-sited conference rooms. Each room contains at least one video telephone that includes a video camera and an image receiver for displaying image frames of at least one remote conferee. The image receiver, video camera, and the eyes of the local conferee define a parallax angle. A frame generating system is further provided for analyzing local conferee image frames, responsive to video signals, and generates a corresponding sequence of parallax-compensated frames. A signal indicative of each parallax-compensated frame is transmitted to a corresponding image receiver for providing apparent eye contact between each local conferee and the displayed image of a corresponding remote conferee. When there are more than three conferees, each input image is additionally analyzed for head position, and the head position is reoriented by the frame generating system as necessary to provide a sense of presence.

Another visual based image tracking system is disclosed in U.S. Pat. No. 5,434,617, to Bianchi. The disclosed system utilizes methodology and circuitry for automatically effecting electronic camera movement to track and display the location of a moving object, such as a person presenting a talk to an audience. The system includes a fixed spotting camera for capturing a field of view and a moving tracking camera with pan, tilt, zoom, and focus functions driven to the present location of the moving object. Information for driving the tracking camera is obtained with reference to the pixel difference between a current image and a previous image within the field of view. A tracking algorithm computes the information necessary to drive the tracking camera from these pixel differences as well as data relative to the field of view of the spotting camera and the present tracking camera position.

U.S. Pat. No. 5,418,595, to Iwasaki et al., is directed to a camera having a subject tracking function and method therefor. The disclosed camera is provided with a light measurement unit which measures light by dividing the subject field into multiple regions and outputs multiple light measurement data relating the brightness of the subject field. A subject tracking unit tracks the subject by detecting the movement of the subject using the output from the light measurement unit and a focal point detecting unit that includes multiple focal point detection regions within the subject field and detects the status of the focal point adjustment unit if the focal point of a photographic lens is manually adjusted. In use, if the focal point of the photographic leans is adjusted by the subject tracking unit and at least one of the multiple focal point detection regions is in focus, the subject tracking unit tracks the subject position in the focal point detection region that is in focus as the new subject.

Additional visual based camera tracking systems are disclosed in U.S. Pat. No. 5,473,369, to Abe, which is directed to an object tracking apparatus; U.S. Pat. No. 5,430,809, to Tomitaka, discloses a human face tracking system; and U.S. Pat. No. 5,572,317 to Parker et al., which discloses a remote-controlled tracking system for tracking a remote control unit and positioning and operating a camera and method.

Another means for enabling a camera to track conferees in a teleconference is detection of their motions. U.S. Pat. No. 5,552,823, to Kageyama, discloses a picture processing apparatus with object tracking. The disclosed apparatus first detects a distribution of motion vectors within a tracking vector detection area. The apparatus then detects a most characteristic motion vector. In a second embodiment, a power of components in a high frequency band is detected per unit of predetermined blocks. The difference data between picture data of motion pictures of the present frame and the previous frame is obtained. The power of the difference data is detected per unit of predetermined blocks, and an edge having movement is detected on the basis of the detection result.

A disadvantage of the camera tracking devices disclosed in the above enumerated prior art references, along with teleconferencing systems in general, is that they fail to utilize sound as an effective camera tracking means. Since people usually direct their attention by first hearing a sound, then moving their head and directing their eyes toward the sound, it would be advantageous to provide a camera tracking system utilizing this process.

OBJECTS OF THE INVENTION

It is therefore an object of the present invention to provide a camera tracking system that continuously tracks a sound emitting object;

It is another object of the present invention to provide a camera tracking system that continuously tracks a plurality of sound emitting objects;

It is a further object of the present invention to provide a camera tracking system that provides a substantially natural transition between each speaking participant of a conference in a manner similar to the natural transition that occurs when people turn their eyes toward different persons during a conversation with more than one person; and It is still another object of the present invention to provide a camera tracking system that intelligently frames a speakers image without mechanically repositioning a video camera.

SUMMARY OF THE INVENTION

These and other objects and advantages of the present invention are achieved by providing a camera tracking system that continuously tracks sound emitting objects, such as various conferees during a teleconference, such as a video-phone conference. The sound or voice activation feature of the present invention enables a video camera to track each speaking participant of the conference in a manner substantially similar to the natural transition that occurs when people turn their eyes toward different persons during a conversation with more than one person. The system provides a lifelike transition between each speaking conferee at a remote location or between conferees at two remote locations, so that the conferees feel at though they were having a face to face conversation. Additionally, the present invention tracks a moving speaker, such as a person presenting a talk to an audience, so that audiences at remote locations feel as if they are part of the speaker's main audience.

One or more camera tracking systems of the present invention may be located at a number of remote locations. The invented tracking system comprises a video camera for transmitting an image from its remote location, a remote screen for receiving images transmitted from other remote locations, and sound sensing means for directing the camera toward a sound source.

Particularly, the video camera used with the tracking system of the present invention may comprise any suitable video camera, camcorder, CCD camera, or other suitable camera known in the art. The camera may be coupled to the sound sensing means using known methods. The camera is preferably coupled to the sound sensing means via a computing device, such as a computer. The computer processes the information transmitted from the sound sensing means for continuously directing the camera toward a sound emitting object. The camera is located adjacent to the screen, so that conferees, for example, speaking toward the camera, will not be looking in a direction substantially away from the screen. Preferably, the present invention utilizes the continuing development of Liquid Crystal Display (LCD) screens and LCD computer monitors. The present invention utilizes the translucent properties of LCD screens by disposing a video camera behind such a screen and retaining the camera in the housing thereof. Thus, a person or persons at each remote location may look directly into the screen, such as a computer monitor or other suitable screen, at their remote location so that they are looking directly at other persons at other remote locations.

Additionally, the camera used in the present invention is preferably configured to provide a wide field of view. The wide field of view enables scaling and cropping of an image captured by the camera without the need to mechanically reposition the camera for framing a speaker, or a portion of the speaker such as their face. Therefore, the invented system is particularly well suited for such applications as teleconferencing.

The sound sensing means of the present invention comprise at least one microphone and preferably at least two stereoscopic microphones. At least a pair of microphones are positioned at each remote location using triangulation techniques, and preferably, three microphones are positioned at a remote location using three dimensional triangulation techniques. Using three dimensional triangulation techniques, a microphone may be placed on either side of the location, with the third microphone positioned near the camera, for example.

Signals and signal levels transmitted by each of the microphones are continuously sensed by the computer. The signals transmitted from each of the microphones are processed by the computer, then transmitted to the remote location simultaneously with the image transmitted by the camera so that persons at each remote location hear and view the speaker as they are performing. The relative signal levels are constantly monitored for determining movement of the speaker for panning or zooming the camera, or both.

As the relative signal level between the microphones changes, such as the signal level transmitted from one or more of the microphones decreasing and the signal level transmitted from another one or more microphone increasing, the computer senses the change in the relative signal level between the microphones and pans camera toward the microphone transmitting the increasing relative signal level, thus moving the camera from its previous position. The computer pans or zooms the camera toward the microphone transmitting the increasing signal level until the change in relative signal levels transmitted from the microphones stabilizes. This indicates that the speaker is stationary and the camera ceases panning. Thus, the camera is precisely positioned in the direction of the speaker, so that persons at remote locations are looking directly at the speaker. When another person at the location begins speaking, or if the speaker begins moving while speaking, upon any change in the relative signal level transmitted by the microphones, the computer senses the change and again starts panning the camera in the direction of the increasing relative signal level. Using triangulation techniques and stereophonic microphones, the present invention provides a natural transition when tracking different speakers and is able to precisely determine the position of each speaker when they are talking.

Optionally, a digital ear may be provided for deaf users of the system. The digital ear may comprise an appropriately configured microphone that may be worn on their person and give a sensation to the user. The sensation may be any suitable sensation, such as a "tapping" sensation, with the magnitude thereof determined by the magnitude of the sound received by the ear. Also, the microphone may be coupled to the computer for indicating to the user the direction of the sound source.

The combination of scaling and cropping an image captured by the camera and the capability to precisely determine the position of the speaker, afforded by the present invention, provides a system suitable for a number of different applications including video-phone.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventor of carrying out his invention. Various modifications, however, will remain readily apparent to those skilled in the art, since the generic principles of the present invention have been defined herein.

Figure 1:
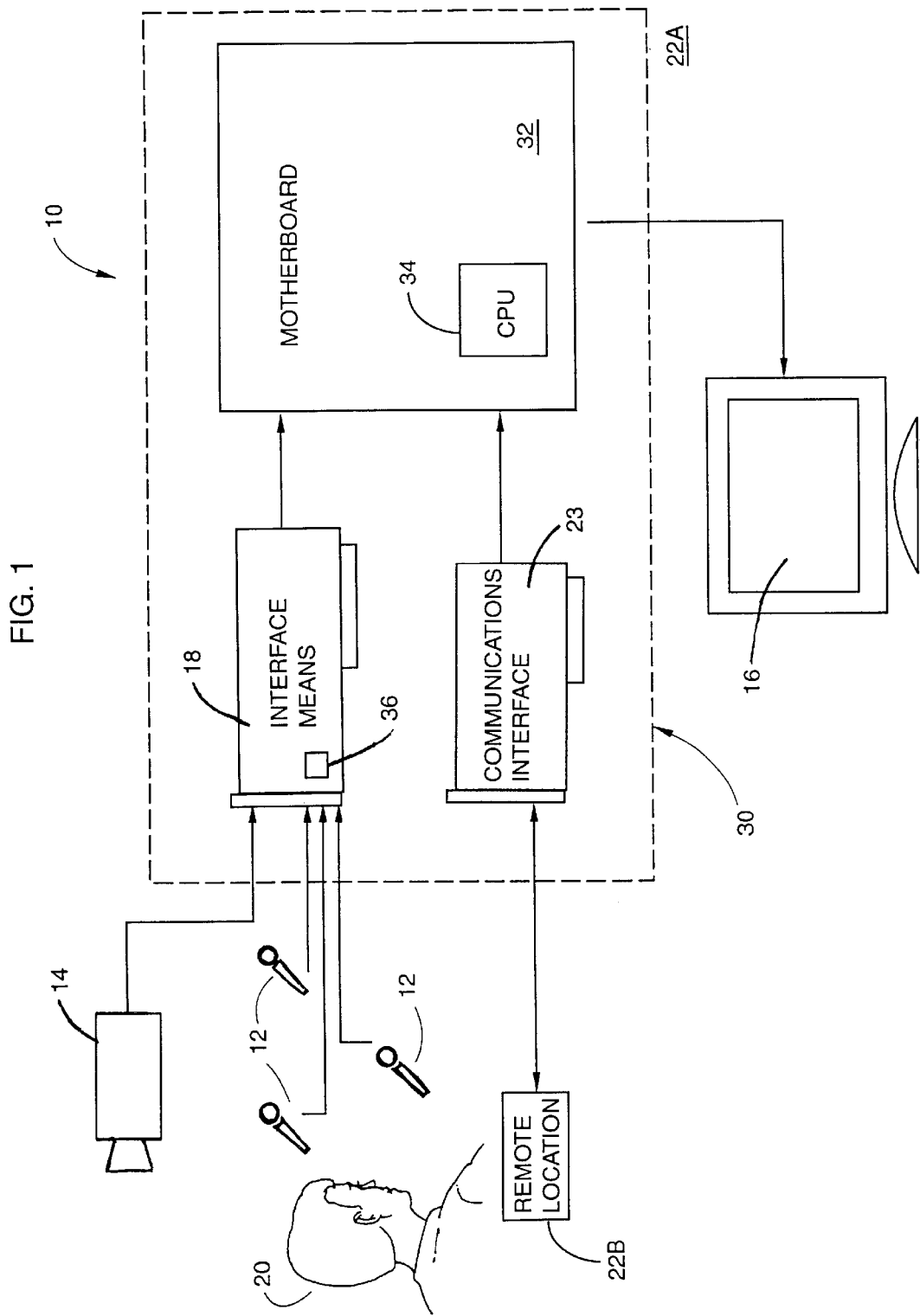
FIG. 1 is a block diagram showing a camera tracking system that continuously tracks sound emitting objects according to the preferred embodiment of the present invention.

Referring now to FIG. 1 of the drawings, there is shown generally at 10 a camera tracking system that continuously tracks sound emitting objects, configured according to the preferred embodiment of the present invention. The camera tracking system 10 of the present invention is designed for applications that comprise the substantially simultaneous transmission of audio and visual signals between two or more remote locations for communication between the two locations. The invented tracking system 10 is well suited for such applications as teleconferencing, video teleconferencing, video-conferencing, and particularly well suited for video-phone as will become apparent from the ensuing description. However, the invented system 10 is also suited for such applications where a speaker may be alone in a recording studio, for example, with the sound activated camera tracking feature of the system 10 enabling the video camera to follow the speaker as they freely move about in the studio without needing an operator for the camera.

In the preferred embodiment, the camera tracking system 10 of the present invention comprises a plurality of sound sensing means, such as microphones 12, image reception means, such as a video camera 14, image display means, such as a screen 16, and interface means 18 for signal processing, each of which will be thoroughly discussed hereinafter.

The tracking system 10 of the present invention enables the video camera 10 to track each sound emitting object, such as a speaker 20 or a number of speaking participants of the conference in a manner substantially similar to the natural transition that occurs when people turn their eyes toward different persons during a conversation with more than one person. The system 10 provides a lifelike transition between each speaking conferee 20 at a first remote location, shown generally at 22A, or between conferees at the first remote location 22A and one or more additional remote locations 22B, so that the conferees feel at though they were having a face to face conversation. Additionally, the present invention tracks a moving speaker 20, such as when the speaker is presenting a talk to an audience, so that audiences at each location 22 feel as if they are part of the speaker's main audience at the first remote location 22A.

One or more camera systems of the present invention 10 may be located at a number of the remote locations 22. The invented tracking system 10 comprises the video camera 14 for transmitting an image from its remote location, the screen 16 for receiving images transmitted from the other remote locations 22, and a communications interface 23, for allowing communications between each of the remote locations 22.

Figure 2A:
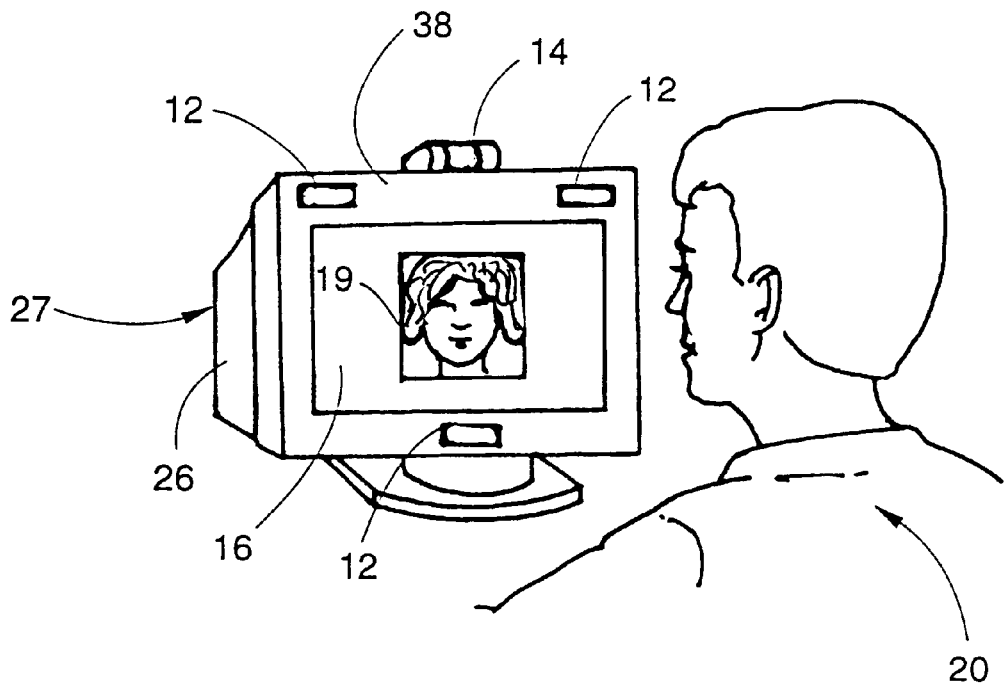
FIG. 2A is a schematic, perspective view of an embodiment of a video screen and camera of the present invention.
Figure 2B:
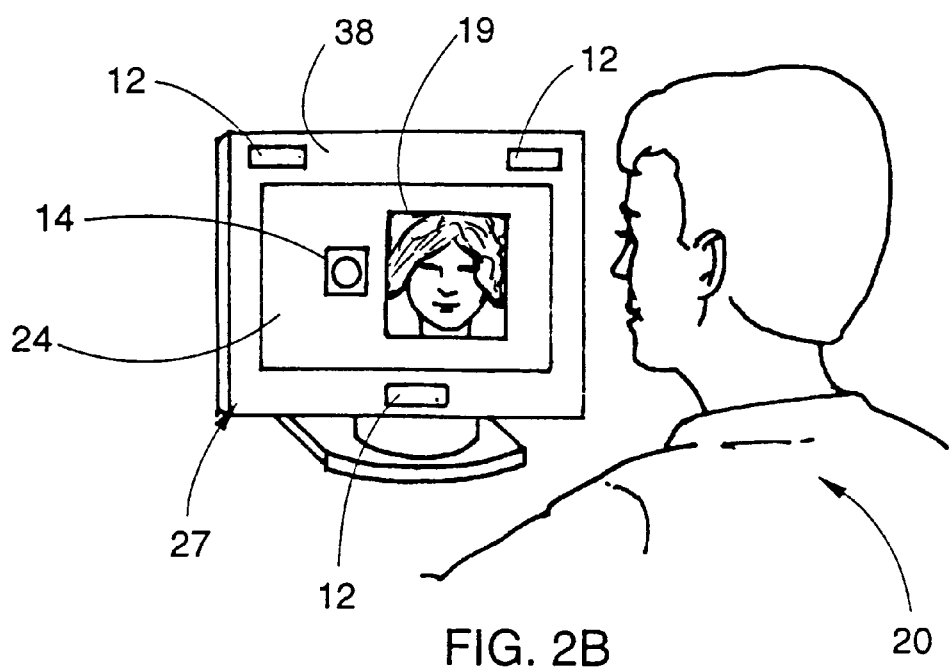
FIG. 2B is a schematic, side view of an alternative embodiment of a video screen and camera of the present invention.

Referring still to FIG. 1, the video camera 14 used with the invented tracking system 10 may comprise any suitable video camera, camcorder, CCD camera, or other suitable camera known in the art. The camera 14 preferably provides a wide field of view to enable scaling and cropping of an image 19 (shown in FIG. 2A and 2B) of the speaker 20 captured by the camera 14. The scaling and cropping of the image 19 intelligently frames the image 19 of the speaker 20 for transmission of the image 19 without the need to mechanically reposition the camera 14 to frame the speaker 20, or a portion of them, such as their face, as shown in FIGS. 2A and 2B. Thus, the speaker's image 19 is typically well positioned in the field of view for transmission of the image 19 to the remote locations 22. Therefore, the invented system 10 is particularly well suited for such applications as video-phone.

Referring to FIG. 1 and FIGS. 2A and 2B of the drawings, the camera 14 is preferably located adjacent to the screen 16 so that speakers 20 at each of the remote locations 22 will not be looking in a direction substantially away from the screen 16. Most preferably, the present invention 10 utilizes the continuing development of Liquid Crystal Display (LCD) screens and LCD computer monitors. The system 10 utilizes the translucent properties of LCD screens by situating the video camera 14 behind such a screen 24. As shown in FIG. 2B, the screen 24 may be installed in a housing 26, to comprise the known computer monitor configuration 27, with the camera 14 additionally retained in the monitor 27.

Appropriate known circuitry (not shown), would be provided to couple the screen 24 and camera 14 to the communications interface 23 for receiving and transmitting video signals. The translucent properties of the LCD screen 24 enable the camera 14 to capture the speaker's image 19, while another speaker 20 is looking at the screen 24 and viewing images 19 transmitted from the remote locations 22. Thus, a speaker 20, or speakers, at each remote location 22 may look directly into the screen 24, at their remote location 22 so that they are looking directly at the images 19 of other speakers 20 at other remote locations 22 while they are talking to each other. Therefore, the invented system 10 is particularly well suited for such applications as videophone.

It is to be understood that the system 10 of the present invention may comprise several different configurations. The system 10 may comprise several different components installed at a remote location 22, that may comprise a conference room, class room, auditorium, or a desired room at a user's home. The system 10 may be integrated into a suitable computing means, such as a known personal computer system 30 for example. When the system 10 is substantially integrated into a personal computer 30, the camera 14 may be integrated into the monitor 27 as discussed above. The microphones 12 additionally may be installed in the monitor 27 in this embodiment.

Referring still to FIG. 1 and FIGS. 2A and 2B, the camera 14 is preferably coupled to the microphones 12 via the interface means 18. When the camera tracking system 10 is integrated into the computer system 30, the interface means 18 is preferably configured as a peripheral printed circuit board, commonly referred to as a "card", that includes connectors for coupling the card to a motherboard 32 containing a CPU 34 of the computer 30. The interface card 18 may contain its own on-board processing chip 36 to facilitate processing of data transmitted by the microphones 12, or the card 18 may use the CPU 34 for data processing. As the interface card 18 receives audio signals from the microphones 12, its on-board circuitry and processing chip 36, either alone or in combination with the CPU 34, continuously process the data transmitted by the microphones 12 for continuously directing the camera 14 toward the speaker 20, so that the speaker's image 19 is substantially continuously optimally framed in the camera's field of view. However, it is to be understood, that the interface means 18 may comprise any suitable configuration, as deemed necessary to achieve the features of the invented system 10.

The microphones 12 of the preferred embodiment of the system 10 comprise at least one microphone 12 and preferably comprise a pair of laterally separated microphones 12 positioned a distance from the camera 14. Most preferably, the present invention 10 is provided with three microphones 14 at each remote location 22, as shown in FIG. 1. The microphones 12 are preferably positioned at each remote location 22 using known triangulation techniques when two microphones 12 are provided, and positioned using three dimensional triangulation techniques when three microphones 12 are provided. Using three dimensional triangulation techniques, a microphone may be placed on either side of the location, with the third microphone positioned near the camera, for example.

Therefore, the microphones 12 are positioned at the remote location 22 at fixed spatial positions that are known to the interface card 18, for determining movement of a sound emitting object relative to the microphones 12. In a computer system application for example, a microphone 12 may be retained in a face 38 of the housing 26 on either side of the screen 24. The microphones 12 may be located at any suitable position at the remote location so long as each microphone's coordinates are known to the interface card 18.

Figure 3:
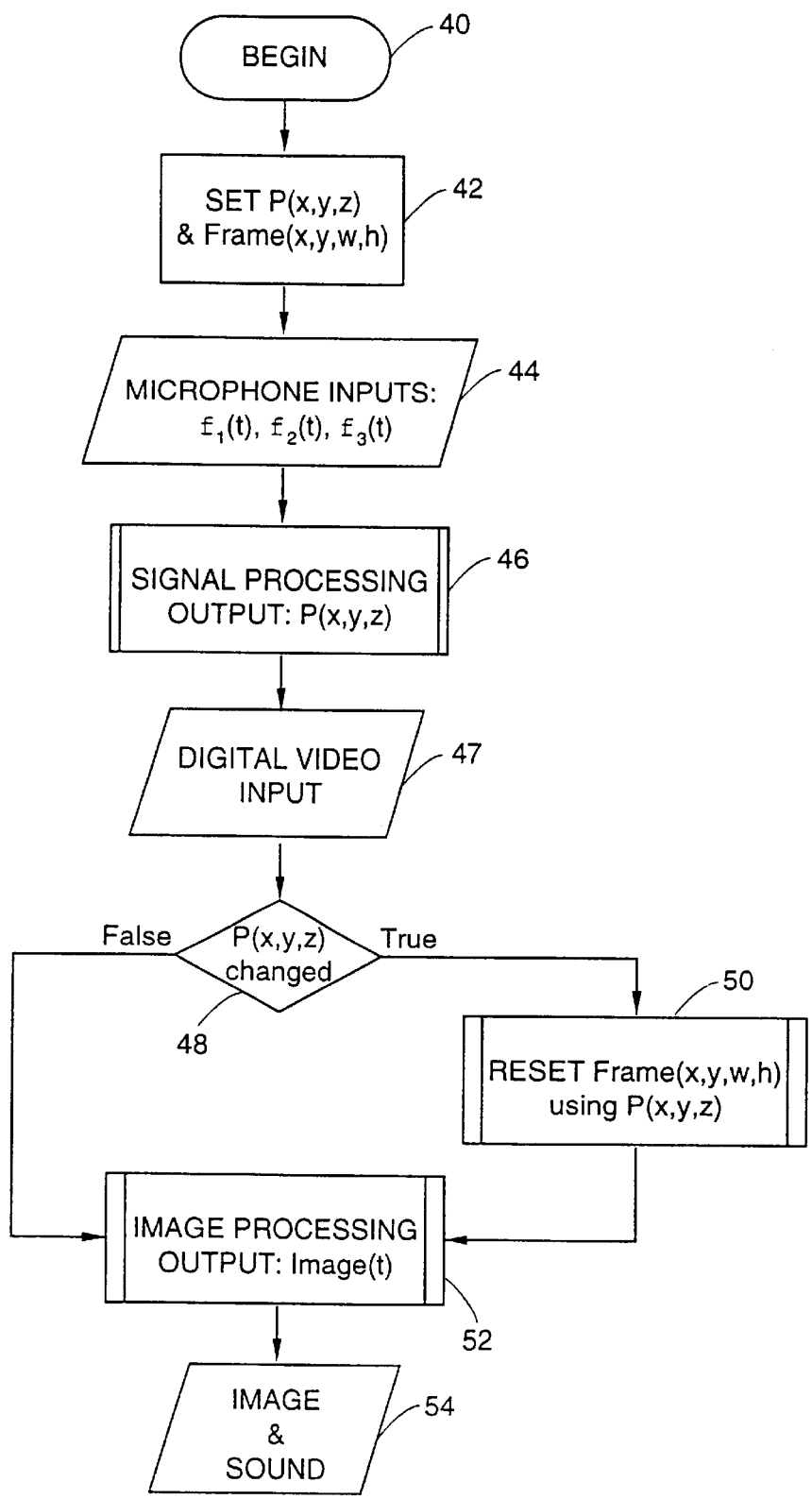
FIG. 3 is a flow chart showing a method of operation of the preferred embodiment of the camera tracking system of the present invention.

Referring now to the flow chart of FIG. 3 and to FIG. 1 of the drawings, in use the invented system 10 is activated and the method of operating the system is invoked in start block 40. When the system 10 is initially activated, the camera 14 is directed toward a desired field of view as shown in process block 42. The microphones 12 are activated as shown in input-output block 44, the microphones 12 continuously transmit audio signals emitted from a sound emitting object, such as the speaker 20, or speakers, to the interface card 18 for processing by the card and CPU 34. The audio signals received by the interface card 18 are continuously processed for evaluating selected characteristics of the audio signals as shown in process block 46.

The selected characteristics of the audio signals may be any detectable characteristic or desired combinations of detectable characteristics. Both time differential between the various sound waves sensed by each of the microphones and audible signal level are desired characteristics. Another detectable characteristic is tone. The interface card 18 may include circuitry for sensing and differentiating tone and for tracking a speaker 20 having a selected tone. This would aid with tracking the speaker 20, particularly in the presence of ambient noise, such as when the remote location 22 comprises an auditorium. The interface card 18 may also include filter circuitry to additionally help with tracking the particular speaker 20 in the presence of ambient noise in order to facilitate the sensing and tracking of a particular voice. In input-output block 47 video signals representative of a speaker's image 19 in the camera's field of view are input into the interface card 18 for processing.

In decision block 48, the interface card 18 is continuously sensing and processing the audio signals transmitted from the microphones 12 and video signals received from the camera 14 for determining if there is a change in at least one characteristic, such as a change in the time difference between received audio signals. If a change is determined in the selected characteristic, then in process block 50 the camera 14 is directed in a direction indicated by the change in the characteristic. The change in the time difference between received audio signals indicates that the speaker 20 has moved. The interface card 18 processes the signals to direct the camera 14 toward the speaker 20. In process block 52, the camera is continuously directed in the direction indicated by the change in the selected characteristic, until the change has stabilized, indicating that the camera 14 is directed toward the speaker. The direction and redirection of the camera 14 may comprises cropping and scaling of the image captured by the camera 14, mechanically repositioning of the camera 14, or both. Thus, the invented system 10 substantially ensures that the speaker 20 is constantly within the field of view of the camera 14. In input-output block 54, the speaker's image 19 and voice, or other sounds, are simultaneously transmitted to remote locations 22 via the communications interface 23.

The constant direction and redirection of the camera 14 is effected in process block 46, wherein the interface card 18 is continuously processing received signals from each of the microphones 12 for evaluating the selected characteristic or characteristics of the audio signals. If a change is determined then in process block 50 the camera 14 is directed in a direction indicated by the change in the characteristic.

Referring again to FIG. 1 and FIGS. 2A and 2B of the drawings, optionally, one of the microphones 12 may be configured as a digital ear for deaf users of the system 10. The microphone 12 would be appropriately configured, so that the microphone 12 could be worn on their person and give a sensation to the user. The sensation may be any suitable sensation, such as a "tapping" sensation, with the magnitude thereof determined by the magnitude of the sound received by the microphone 12. Also, the microphone 12 may be coupled to the interface card 18 for indicating to the user 20 the direction of the sound source.

Thus, there has been described a camera tracking system that continuously tracks sound emitting objects. The camera tracking system is well suited for such applications as video-phone, teleconferencing, video teleconferencing. The invented camera tracking system enables a video camera to track each speaking participant of the conference in a manner substantially similar to the natural transition that occurs when people turn their eyes toward different persons during a conversation with more than one person. The system provides a lifelike transition between each speaking conferee at a remote location or between conferees at two remote locations, so that the conferees feel at though they were having a face to face conversation. One or more camera systems of the present invention may be located at a number of remote locations. With the camera is disposed behind the screen, the user can look directly at the screen and gaze directly into the camera, so that users at each remote location look directly into the screen, so that each of the users are looking directly at the other users at the other remote locations, instead of slightly away from the screen as occurred in the prior art.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A camera tracking system that tracks sound emitting objects, the system comprising:
   image reception means for generating video signals representative of an image;
   audio sensing means for generating audio signals representative of speech and other sounds; and
   interface means coupled to the audio sensing means and to the image reception means, the interface means sensing characteristics of the audio signals generated by the audio sensing means for automatically, digitally cropping and scaling the image to allow display of a framed video image including a sound emitting object.

2. The system of claim 1 wherein when the interface means senses a change in the characteristics of the audio signals indicating a new position of the sound emitting object, the interface means adjusts the framed video image by recropping and rescaling the image until the framed video image includes the sound emitting object.

3. The system of claim 1 further comprising image display means for displaying an image.

4. The system of claim 1 wherein the system further includes signal transmission means for processing the video signals generated by the image reception means and audio signals generated by the audio sensing means, the transmission means transmitting the processed video and audio signals to at least one remote location.

5. The camera tracking system of claim 1 wherein said image reception means is stationary.

6. A camera tracking system that tracks sound emitting objects, the system comprising:
   a plurality of audio sensing means for generating audio signals representative of speech and other sounds, each of the audio sensing means generating an audio indicating signal indicative of sound sensed thereby and emitted by a sound emitting object;
   image reception means for generating video signals representative of an image; and
   interface means coupled to the plurality of audio sensing means and to the image reception means, the interface means continuously sensing the indicating signals generated by the audio sensing means for determining any change in the indicating signals for continuously determining a mobile location of a sound emitting object and directing the image reception means toward the sound emitting object, the interface means creating a framed video image including the sound emitting object.

7. The system of claim 6 wherein the indicating signals generated by the audio sensing means indicate a time differential between sound waves sensed by the sensing means, when the interface means determines that the indicating signal generated by at least one of the audio sensing means has changed, such as the time differential between sound waves sensed by the sensing means increasing or decreasing, indicating that the sound emitting object has moved, the interface means adjusts the framed video image until the image contains the sound emitting object.

8. The system of claim 6 wherein the indicating signals generated by the audio sensing means indicate sound intensity sensed by the sensing means, when the interface means determines that the indicating signal generated by at least one of the audio sensing means has changed indicating that the amplitude of the sound sensed thereby has changed, the interface means adjusts the framed video image until the image contains the sound emitting object.

9. The system of claim 6 wherein the audio sensing means comprises a pair of laterally separated microphones each at a known position with respect to the image reception means, each of the microphones sensing sound emitted by the sound emitting object for transmitting its indicating signal to the interface means for determining any change in the location of the sound emitting object to continuously adjust the framed video image to maintain the sound emitting object within the image.

10. The system of claim 9 wherein the audio sensing means further includes a third microphone vertically positioned at a known position with respect to the pair of laterally separated microphones, each of the microphones sensing sound emitted by the sound emitting object for transmitting its indicating signal to the interface means for determining any change in the location of the sound emitting object to continuously adjust the framed video image to maintain the sound emitting object within the image.

11. The system of claim 10 wherein the microphones are positioned to facilitate three dimensional triangulation techniques.

12. The system of claim 6 wherein the image captured by the image reception means is a wide field of view that includes the sound emitting object, and
   the interface means further comprising scaling and cropping means for selecting a portion of the image containing the sound emitting object and for framing the image in the selected portion creating the framed video image of the sound emitting object.

13. The system of claim 12 wherein the image reception means comprises a desired one of a video camera and a CCD camera.

14. The system of claim 13 further comprising:
   at least one additional system located at at least one additional remote location, and
   signal transmission means for transmitting the audio indicative and framed video image signals to the remote locations and receiving audio and framed video signals from the remote locations for enabling communication between the locations.

15. The system of claim 6 wherein the interface means further includes means for sensing and differentiating tone and for tracking a sound emitting object having a selected tone.

16. The system of claim 6 wherein the interface means further includes filter means for sensing and tracking a particular sound emitting object in the presence of ambient noise and for distinguishing a speaker's voice in the presence of the voices of others.

17. The system of claim 6 wherein the interface means comprises a computing means.

18. The camera tracking system of claim 6 further comprising an image display means for displaying an image.

19. The camera tracking system of claim 6 wherein said image reception means is stationary.

20. A camera tracking system that tracks sound emitting objects, the system comprising:

image display means for displaying an image;

a plurality of audio sensing means for generating audio signals representative of speech and other sounds, each of the audio sensing means generating an audio indicating signal indicative of sound sensed thereby and emitted by a sound emitting object;

image reception means for generating video signals representative of an image, the image reception means being a desired one of a video camera and a CCD camera and capturing a wide field of view that includes an image of the sound emitting object; and interface means coupled to the plurality of audio sensing means and to the image reception means, the interface means continuously sensing the indicating signals generated by the audio sensing means for determining any change in the indicating signals for continuously directing the image reception means toward a sound emitting object, wherein when the interface means determines that the indicating signal generated by at least one of the audio sensing means has changed, the interface means redirects the image reception means until the change in the indicating signals stabilizes indicating that the image reception means is directed toward the sound emitting object, the interface means having scaling and cropping means for selecting a portion of the field of view containing the image of the sound emitting means and for framing the image in the selected portion to transmit video signals representative of the image, wherein the camera is disposed behind the image display means and retained in a housing thereof, the image display means comprising a screen configured to enable the camera to capture the image of a user while enabling the user to look directly at the screen and gaze directly into the camera, wherein at least one user at each remote location may look directly into the screen, with the camera capturing their image so that users at each remote location are looking directly at the other users at the other remote locations.

21. The system of claim 20 wherein the image display means comprises a substantially translucent material.

22. The system of claim 21 wherein the image display means comprises a Liquid Crystal Display screen.

23. A camera tracking system that tracks sound emitting objects, the system comprising:

image display means for displaying an image;

a plurality of audio sensing means for generating audio signals representative of speech and other sounds, each of the audio sensing means generating an audio indicating signal indicative of sound sensed thereby and emitted by a sound emitting object;

image reception means for generating video signals representative of an image;

interface means coupled to the plurality of audio sensing means and to the image reception means, the interface means continuously sensing the indicating signals generated by the audio sensing means for determining any change in the indicating signals for continuously directing the image reception means toward a sound emitting object, wherein when the interface means determines that the indicating signal generated by at least one of the audio sensing means has changed, the interface means redirects the image reception means until the change in the indicating signals stabilizes indicating that the image reception means is directed toward the sound emitting object; and a digital microphone worn on a deaf user's person for indicating to the user any change in the location of the sound emitting object, the microphone including means for delivering a tapping sensation to the user for indicating to the user the direction of the sound emitting object, the amplitude of the tapping indicating the amplitude of the sound sensed by the digital microphone.

24. A method for digitally framing an image by tracking sound emitting objects, the method comprising the steps of:

placing at least two audio sensing means at known positions relative to an image reception means;

sensing sound waves emitted by a sound emitting object, the sound waves representative of speech and other sounds;

generating audion signals representative of the sound waves sensed;

processing the audio signals using triangulation techniques to determine the position of the sound emitting object;

capturing a wide field-of-view image including the sound emitting object;

genereating a framed video image by automatically digitally scaling and cropping the wide field-of-view image;

continuing to process the audio signal to continuously determine the location of the sound emitting object.

25. The method of claim 24 wherein the triangulation technique uses a time differential between the sound waves to determine the location of the sound emitting object.

26. The method of claim 24 wherein the image reception means is placed behind at least a portion of an image display to simulate natural eye contact between users at remote locations.

27. The method of claim 24 wherein, when the location of the sound emitting object is abruptly changed to a new location, the system simulates a natural eye transition by iteratively recropping and rescaling the image toward the new location until the new location is within the framed video image, thereby simulating the eyes' naturally panning motion when transitioning to a new sound emitting object, such as a new speaker.

28. The method of claim 24 further comprising the steps of:

transmitting the audio signals and the framed video image to a remote location; and receiving the audio signals and the framed video image at the remote location.

29. The method of claim 24 further comprising the step of maintaining the sound emitting object within the framed image.

30. The method of claim 29 wherein maintaining the sound emitting object within the framed image is accomplished by rescaling and recropping the wide field-of-view image when the sound emitting object moves.

31. A sound tracking system for automatically reframing a video image, comprising:
- a camera having a fixed position and generating a video image,
- at least two microphones having known relative positions with respect to the camera,
- an interface means for processing input from the at least two microphones to utilize triangulation to determine the position of an audio source and for creating a framed video image of the audio source from the video image generated by the camera, and
- image processing means for cropping and scaling the video image generated by the camera to create the framed video image.

32. The sound tracking system of claim 31 further comprising a transmission means for transmitting audio signals from the at least two microphones and the framed video image to a remote location.

33. The sound tracking system of claim 31 wherein the camera has a wide field of view and an image sensor.

34. The sound tracking system of claim 33 wherein said camera is a CCD.

35. The sound tracking system of claim 31 further comprising a display device connected to the interface means and wherein the camera is located behind at least a portion of the display device.

36. The sound tracking system of claim 35 wherein the display device is chosen from the group of display devices including a computer monitor and a translucent LCD panel.

37. The sound tracking system of claim 31 wherein the at least two microphones are three microphones used to accurately triangulate the audio source within three dimensions.

38. The sound tracking system of claim 31 wherein the interface means determines the position of the audio source by measuring an offset time between the input from the microphones.

39. The sound tracking system of claim 31 wherein the interface means is capable of differentiating one audio source from other audio sources by tonality variations between audio sources.

40. The sound tracking system of claim 39 wherein the interface means is capable of tracking a plurality of audio sources simultaneously.

41. The sound tracking system of claim 31 wherein the interface means simulates panning by continuously digitally recropping the image when the audio source location changes.

* * * * *